(12) United States Patent
Sasaki et al.

(10) Patent No.: US 12,325,367 B2
(45) Date of Patent: Jun. 10, 2025

(54) HIGH-VOLTAGE CABLE CONNECTION STRUCTURE

(71) Applicant: TOYOTA JIDOSHA KABUSHIKI KAISHA, Aichi-ken (JP)

(72) Inventors: Manabu Sasaki, Hashima (JP); Keisuke Sawazaki, Nisshin (JP); Takashi Hayashi, Nagoya (JP); Akira Yamamoto, Yokkaichi (JP); Shota Fuchigami, Toki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 278 days.

(21) Appl. No.: 18/173,797

(22) Filed: Feb. 24, 2023

(65) Prior Publication Data

US 2023/0271572 A1    Aug. 31, 2023

(30) Foreign Application Priority Data

Feb. 25, 2022 (JP) ................. 2022-027564

(51) Int. Cl.
  *B60R 16/02* (2006.01)
  *B60R 16/023* (2006.01)
  *H01M 50/543* (2021.01)
  *H01R 13/53* (2006.01)

(52) U.S. Cl.
  CPC ...... *B60R 16/0215* (2013.01); *B60R 16/0238* (2013.01); *H01R 13/53* (2013.01); *H01M 50/543* (2021.01); *H01R 2201/26* (2013.01)

(58) Field of Classification Search
  CPC .... B60K 1/00; B60K 1/04; B60K 2001/0438; B60R 16/0215; B60R 16/0238; B60R 16/02; B60R 16/023; B60R 16/0207; B60Y 2400/61; B60Y 2410/115; H01M 50/543; H01R 13/44; H01R 13/53; H01R 13/748; H01R 2201/26; Y02T 10/70; Y02T 10/7072; Y02T 90/12; Y02T 90/14; B60L 50/64; B60L 50/66; B60L 53/18
  USPC ........................................ 174/72 R; 307/10.7
  See application file for complete search history.

(56) References Cited

U.S. PATENT DOCUMENTS

| 5,458,496 | A | 10/1995 | Itou et al. |
| 2013/0148251 | A1 | 6/2013 | Iwashita et al. |
| 2014/0333130 | A1* | 11/2014 | Matano .................. B60L 50/66 307/10.7 |
| 2019/0016208 | A1 | 1/2019 | Tomokage et al. |

(Continued)

FOREIGN PATENT DOCUMENTS

| EP | 2711247 A1 | 3/2014 |
| JP | H07-094240 A | 4/1995 |

(Continued)

*Primary Examiner* — Timothy J Thompson
*Assistant Examiner* — Guillermo J Egoavil
(74) *Attorney, Agent, or Firm* — HAUPTMAN HAM, LLP

(57) ABSTRACT

A high-voltage cable connection structure includes a first connector to which a plurality of first high-voltage cables, each connected to a corresponding one of a plurality of terminals of a high-voltage battery, are connected, and a connector receptacle provided in a high-voltage control unit disposed outside a vehicle passenger compartment. Inserting the first connector into and pulling out the first connector from the connector receptacle allows connection and disconnection between the plurality of first high-voltage cables and the high-voltage control unit.

6 Claims, 9 Drawing Sheets

(56) References Cited

U.S. PATENT DOCUMENTS

2019/0193565 A1* 6/2019 Yuki .................... B60L 3/0007
2021/0339638 A1* 11/2021 Blakborn ............... H01R 43/26

FOREIGN PATENT DOCUMENTS

| | | |
|---|---:|---|
| JP | 201228059 A | 2/2012 |
| JP | 2012161122 A | 8/2012 |
| JP | 2013-123285 A | 6/2013 |
| JP | 201752302 A | 3/2017 |
| JP | 2019-022284 A | 2/2019 |
| JP | 2019-111982 A | 7/2019 |
| KR | 10-2013-0125024 A | 11/2013 |
| KR | 10-2019-0119280 A | 10/2019 |

* cited by examiner

HIGH-VOLTAGE CABLE CONNECTION STRUCTURE

CROSS REFERENCE TO RELATED APPLICATION

This application claims priority to Japanese Patent Application No. 2022-027564 filed on Feb. 25, 2022, which is incorporated herein by reference in its entirety including the specification, claims, drawings, and abstract.

TECHNICAL FIELD

The present disclosure relates to a connection structure between high-voltage cables and a high-voltage control unit.

BACKGROUND

Electric vehicles and hybrid vehicles are equipped with a battery pack containing a high-voltage battery for supplying power to a vehicle drive motor. The battery pack has a service plug attached thereto. The service plug can be inserted into and removed from the battery pack, and when it is removed from the battery pack, a high-voltage circuit of the high-voltage battery is shut off. Many service plugs are disposed near a passenger compartment and configured to be pulled out toward the inside of the passenger compartment (see, for example, JP 2017-052302 A).

The electric vehicles and hybrid vehicles are also equipped with a power control unit (hereinafter, referred to as "PCU") that controls power supplied to the motor. High-voltage cables connecting between the PCU and the motor or between the PCU and the battery are often connected to the PCU by connecting bus bars connected to the high-voltage cables to terminals of the PCU with bolts (see, for example, JP 2012-161122 A).

When the PCU and the high-voltage cables are connected to each other by means of the bolts as described in JP 2012-161122 A, maintenance of the high-voltage circuit of the PCU and the motor is performed after the service plug, such as the one described in JP 2017-052302 A, is removed and the high-voltage circuit is shut off.

CITATION LIST

PATENT DOCUMENT 1: JP 2017-052302 A
PATENT DOCUMENT 2: JP 2012-161122 A

SUMMARY

When the service plug is disposed near the passenger compartment, electromagnetic waves may propagate into the passenger compartment through the service plug. This results in a need for parts to reduce the propagation of electromagnetic waves into the passenger compartment, which makes the structure more complex and costly.

An objective of the disclosure is therefore to reduce electromagnetic waves propagated from the high-voltage circuit into the passenger compartment with a simple structure and to make it possible to shut off the high-voltage circuit during maintenance.

A high-voltage cable connection structure according to the present disclosure includes a first connector to which a plurality of first high-voltage cables, each connected to a corresponding one of a plurality of terminals of a high-voltage battery, are connected, and a connector receptacle provided in a high-voltage control unit disposed outside a passenger compartment, and, in this high-voltage cable connection structure, inserting the first connector into and pulling out the first connector from the connector receptacle allows connection and disconnection between the plurality of first high-voltage cables and the high-voltage control unit.

It is thus possible to disconnect the first high-voltage cables and the high-voltage control unit by pulling out the first connector from the high-voltage control unit disposed outside the passenger compartment, and therefore there is no need to dispose the service plug near the passenger compartment as in the conventional techniques. This eliminates the need to install parts to reduce propagation of electromagnetic waves into the passenger compartment and makes it possible to reduce electromagnetic waves propagating into the passenger compartment with a simple configuration.

In the high-voltage cable connection structure according to the present disclosure, it is also possible that the first connector includes a casing in which a plurality of connector-side mating terminals, each connected to one end of a corresponding one of the first high-voltage cables, and the ends of the first high-voltage cables are fixed inside, the connector receptacle includes a plurality of equipment-side mating terminals, each connected to a corresponding one of a plurality of terminals of high-voltage equipment provided inside the high-voltage control unit, each of the connector-side mating terminals is mated with a corresponding one of the equipment-side mating terminals, thereby electrically connecting the first high-voltage cable to the terminal of the high-voltage equipment, and that advancing and retracting the casing of the first connector with respect to the high-voltage control unit allows the connector-side mating terminals to mate with the equipment-side mating terminals and the connector-side mating terminals to be removed from the equipment-side mating terminals.

By attaching the connector-side mating terminals to the casing in this manner, it is possible to retract the casing from the high-voltage control unit, thereby removing the connector-side mating terminals from the equipment-side mating terminals and shutting off the high-voltage circuit.

In the high-voltage cable connection structure according to the present disclosure, the first connector includes insulating tubes disposed between outer circumferences of the connector-side mating terminals and the casing, and tip portions of the insulating tubes protrude beyond an end surface of the casing.

This can prevent workers from contacting the connector-side mating terminals while the first connector is pulled out from the high-voltage control unit.

The high-voltage cable connection structure according to the present disclosure further includes a bolt that secures the first connector to the high-voltage control unit with the first connector inserted in the connector receptacle, an interlock device that is provided in the high-voltage control unit and outputs a signal that shuts off system main relays arranged between the plurality of terminals of the high-voltage battery and the first high-voltage cables, an interlock plug receptacle provided in the high-voltage control unit and connected to the interlock device, and an interlock plug to be inserted into the interlock plug receptacle, and, in this high-voltage cable connection structure, the interlock plug may be engaged with the bolt when it is inserted into the interlock plug receptacle.

This can enhance the safety of maintenance work, because the bolts can only be accessed after the interlock plug is removed and the interlock device shuts off the system main relays.

In the high-voltage cable connection structure according to the present disclosure, it is also possible that a second connector to which a plurality of second high-voltage cables connecting between the high-voltage control unit and a high-voltage device disposed outside the high-voltage control unit are connected is connected to the high-voltage control unit, the second connector includes a plurality of terminal plates each connected to one end of a corresponding one of the second high-voltage cables, the high-voltage control unit includes a unit casing that houses a terminal block to which the terminal plates of the second connector are connected and is provided with holes through which the terminal block is accessed when the terminal plates are attached to the terminal block, and service covers that cover the holes, and that the first connector has an arm that extends over a fastening member securing the service covers to the unit casing so as to cover the fastening member to prevent access to the fastening member.

This can enhance the safety of maintenance work, because the fastening member of the second connector can only be accessed after the first connector is removed from the high-voltage control unit and the high-voltage circuit is shut off.

The present disclosure makes it possible to reduce electromagnetic waves propagated from the high-voltage circuit into the passenger compartment with a simple structure and to shut off the high-voltage circuit during maintenance.

BRIEF DESCRIPTION OF DRAWINGS

Embodiments of the present disclosure will be described based on the following figures, wherein.

DESCRIPTION OF EMBODIMENTS

Figure 1:
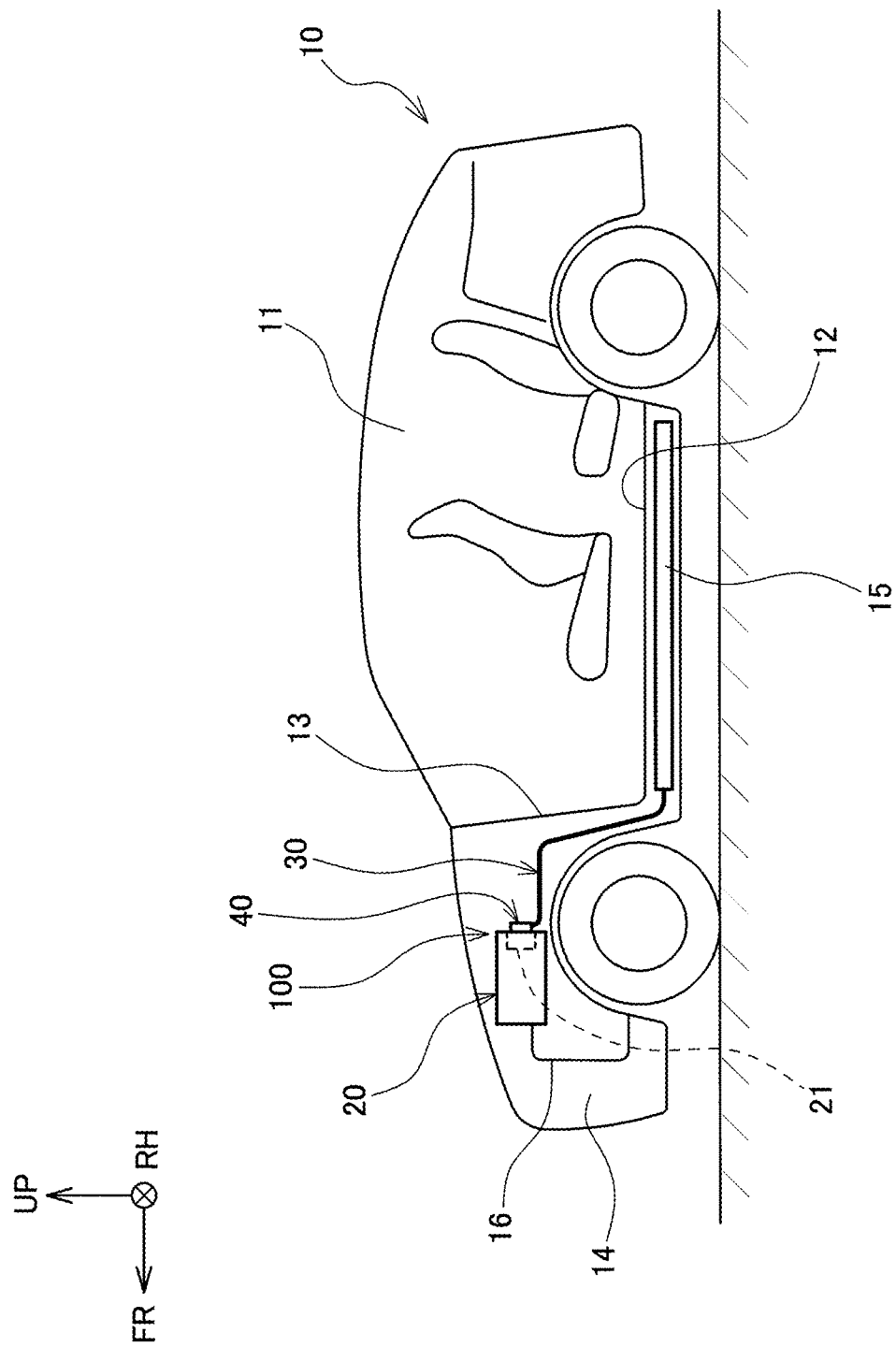
FIG. 1 is a side cross-sectional view showing a vehicle equipped with a high-voltage cable connection structure according to an embodiment.

Hereinafter, a high-voltage cable connection structure 100 according to an embodiment will be described with reference to the drawings. First, a vehicle 10 equipped with the high-voltage cable connection structure 100 according to the embodiment will be described with reference to FIG. 1. In the drawings, arrows "FR," "UP," and "RH" respectively represent the forward direction (traveling direction), the upward direction, and the right direction of the vehicle 10. The directions opposite to the arrows "FR," "UP," and "RH" respectively represent the rearward direction, the downward direction, and the left direction of the vehicle. Hereinafter, when the description is given simply using front and rear, right and left, and up and down directions, unless otherwise specified, they respectively represent front and rear in the vehicle front-and-rear direction, right and left in the vehicle right-and-left direction (vehicle width direction), and up and down in the vehicle up-and-down direction.

As shown in FIG. 1, the vehicle 10 has a passenger compartment 11 and a front compartment 14 on the front side of the vehicle 10. The passenger compartment 11 and the front compartment 14 are separated from each other by a dash panel 13. The front compartment 14 houses a drive unit 16, such as a motor for driving the vehicle 10, and a high-voltage control unit 20 that controls high-voltage power supplied to the drive unit 16. A high-voltage battery 15 for supplying high-voltage power to the drive unit 16 is mounted on the underside of a floor panel 12 of the passenger compartment 11. One end of a first high-voltage cable 30 is connected to the high-voltage control unit 20 by means of a first connector 40, and the other end of the first high-voltage cable 30 is connected to the high-voltage battery 15.

Figure 2:
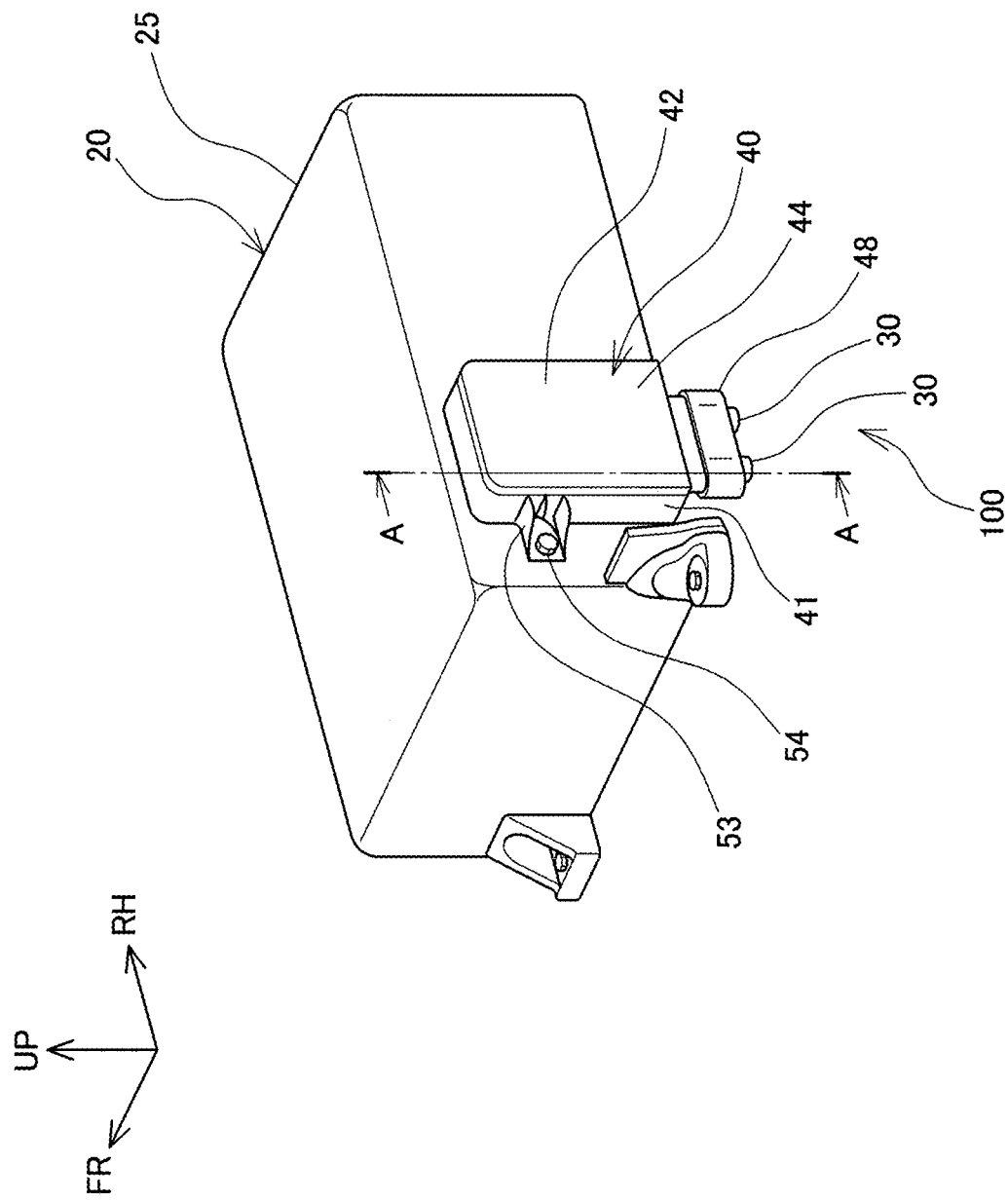
FIG. 2 is a perspective view showing a high-voltage control unit and a first connector connected by the high-voltage cable connection structure according to the embodiment.

As shown in FIG. 2, the high-voltage control unit 20 is composed of a generally rectangular parallelepiped unit casing 25 and high-voltage equipment contained therein. The first connector 40 is secured to the vehicle rear side surface of the high voltage control unit 20 with a bolt 54.

The first connector 40 is connected to two first high-voltage cables 30. Each of the two first high-voltage cables 30 is connected to a corresponding one of positive and negative terminals of the high-voltage battery 15. Inserting the first connector 40 into a connector receptacle 21 of the high-voltage control unit 20 (see FIGS. 1 and 3) allows connection between the high-voltage battery 15 and the high-voltage equipment contained in the high-voltage control unit 20. The first connector 40 and the connector receptacle 21 constitute the high-voltage cable connection structure 100 according to the embodiment.

The high voltage control unit 20 may be any device that controls high voltage. To give an example, the high voltage control unit 20 may be a PCU that converts DC power supplied from the high voltage battery 15 into AC power and supplies it to the motor. In this case, the PCU may contain a power converter and an inverter as the high-voltage equipment.

Figure 3:
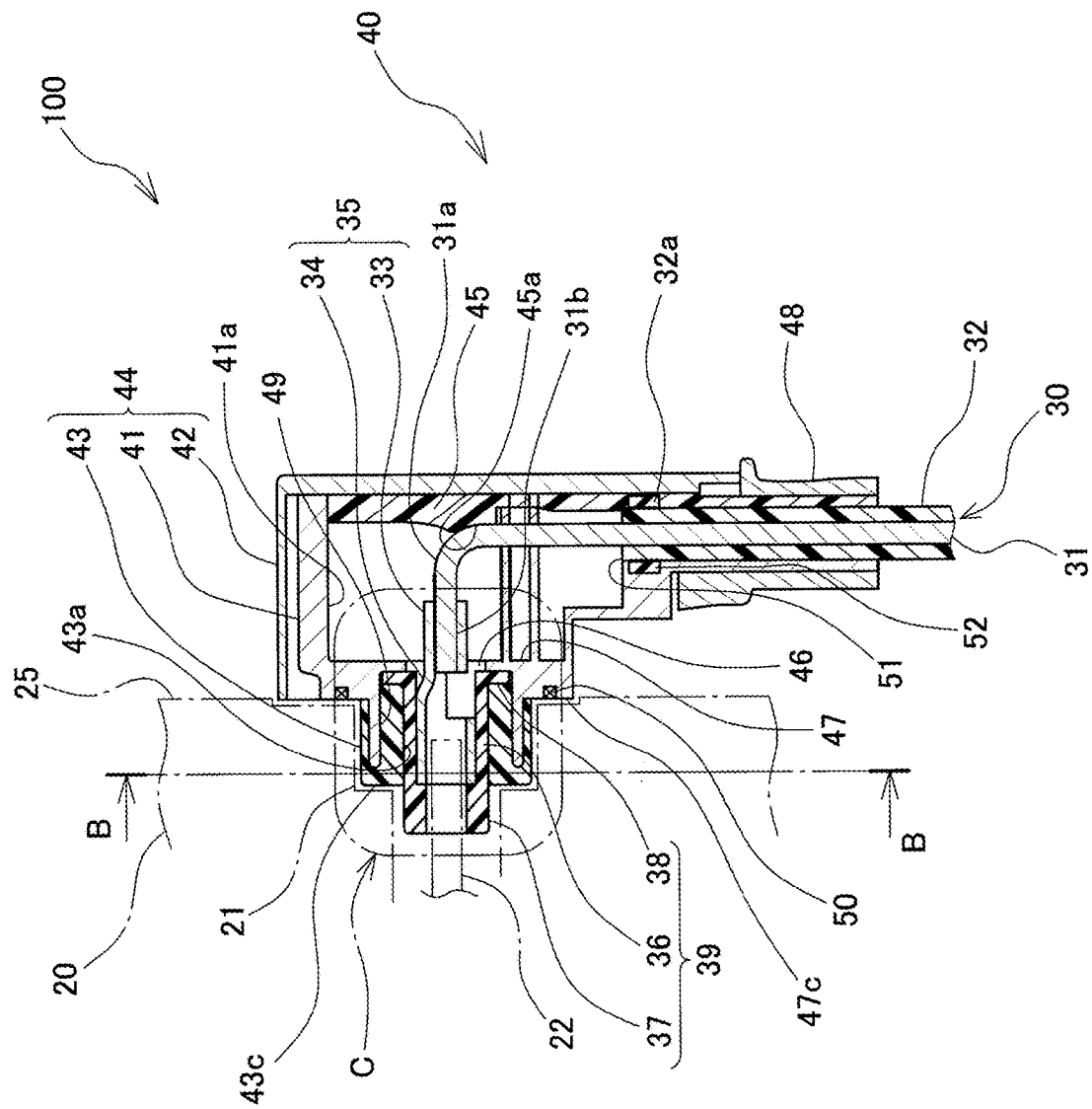
FIG. 3 is a cross-sectional view showing the high-voltage cable connection structure according to the embodiment, taken along line A-A in FIG. 2.

Next, the structure of the first connector 40 will be described in detail with reference to FIGS. 3 to 5. As shown in FIG. 3, the first connector 40 has a casing 44, connector-side mating terminals 35, and insulating tubes 39.

Figure 4:
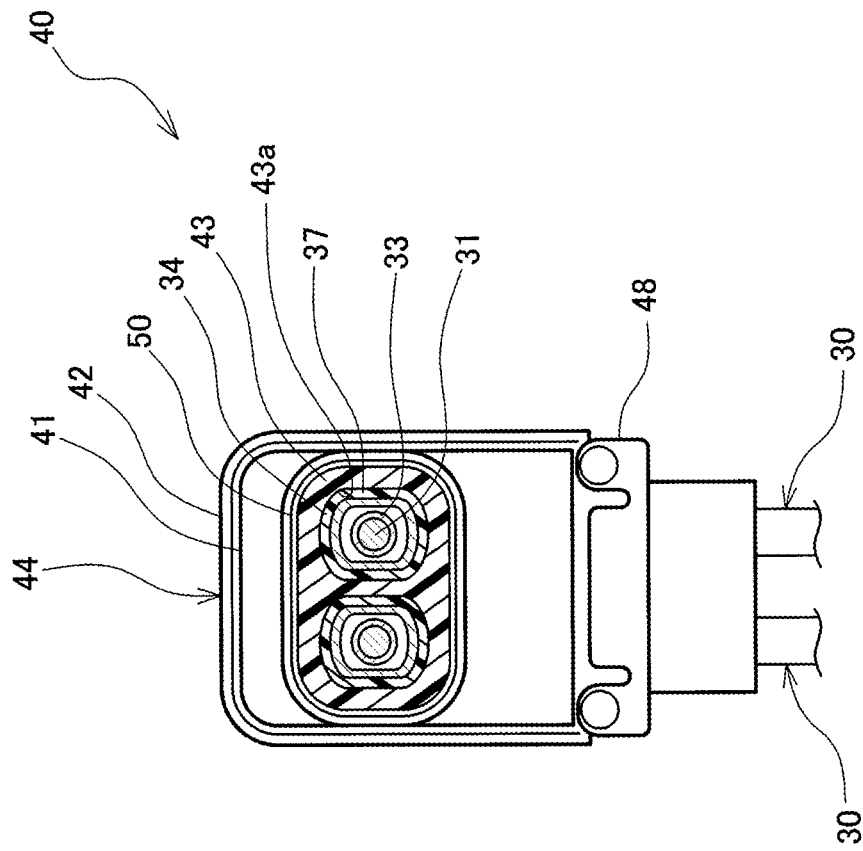
FIG. 4 is a partial cross-sectional view showing the high-voltage cable connection structure according to the embodiment, taken along line B-B in FIG. 3.

As shown in FIGS. 3 and 4, the casing 44 is composed of a casing body 41, a casing lid 42, and an insulating bushing 43.

Figure 5:
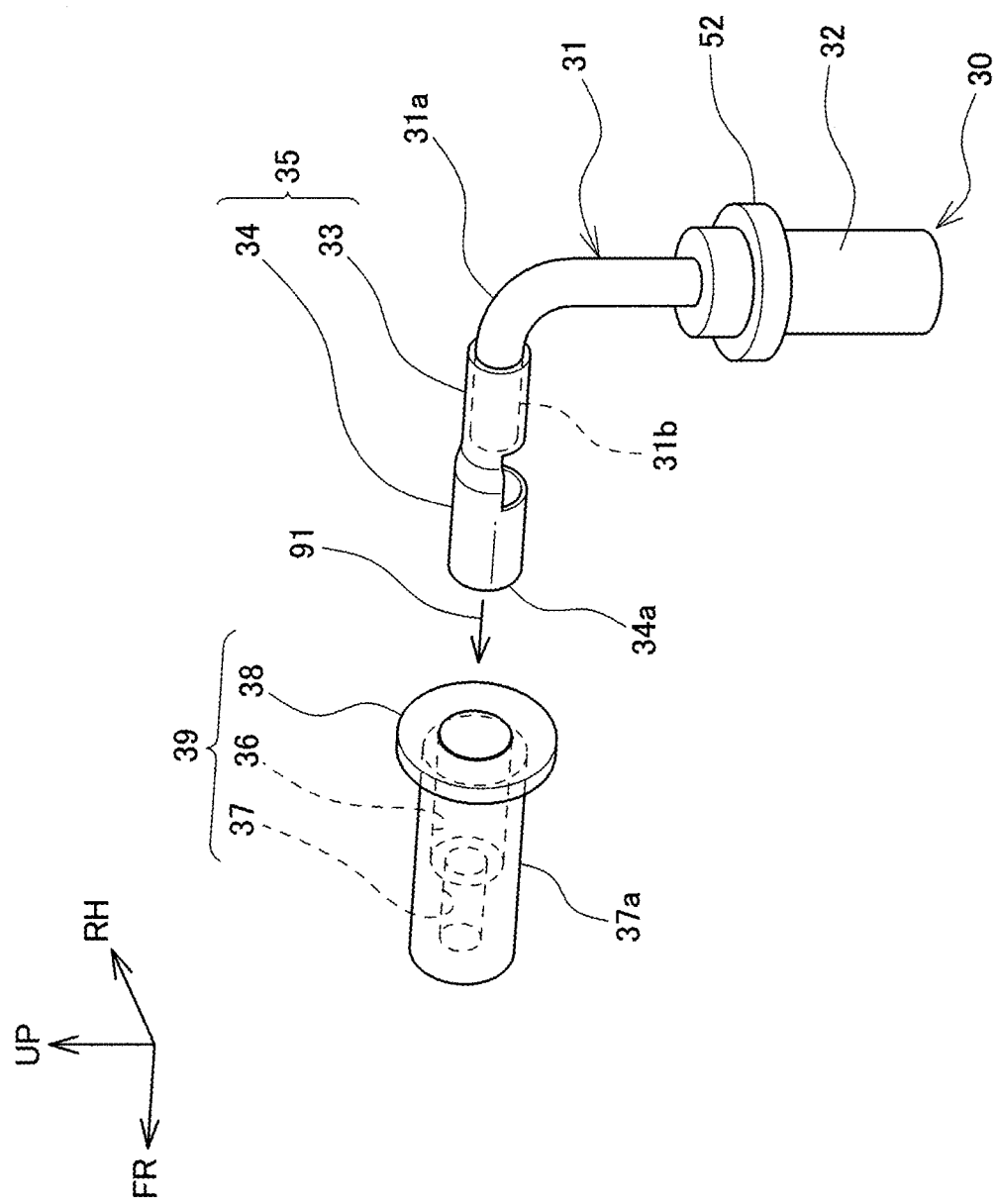
FIG. 5 is a perspective view showing a high-voltage cable, connector-side mating terminal, and an insulating tube of the first connector.
Figure 6:
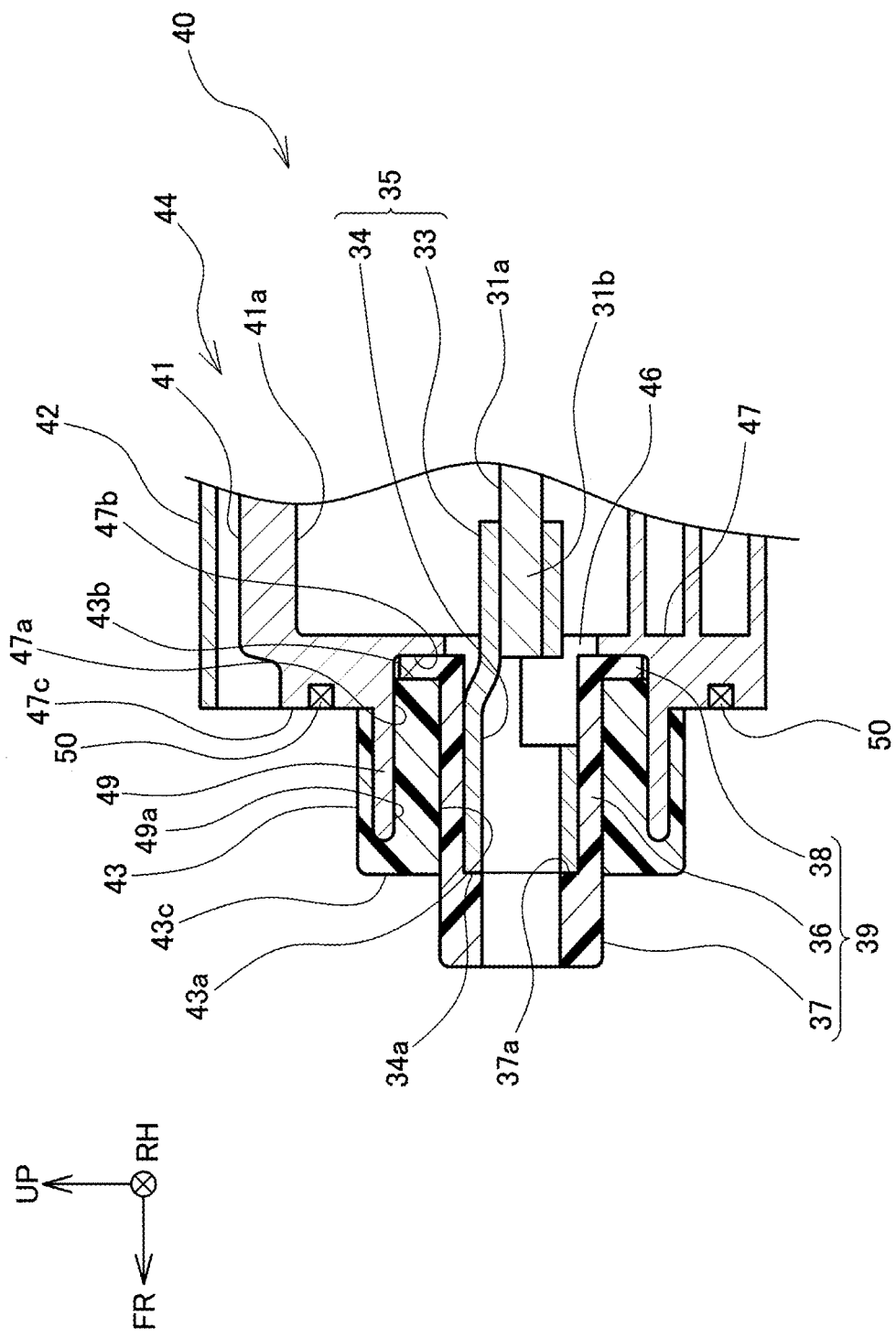
FIG. 6 is a cross-sectional view showing the high-voltage cable connection structure according to the embodiment, illustrating part C of FIG. 3 in detail.
Figure 7:
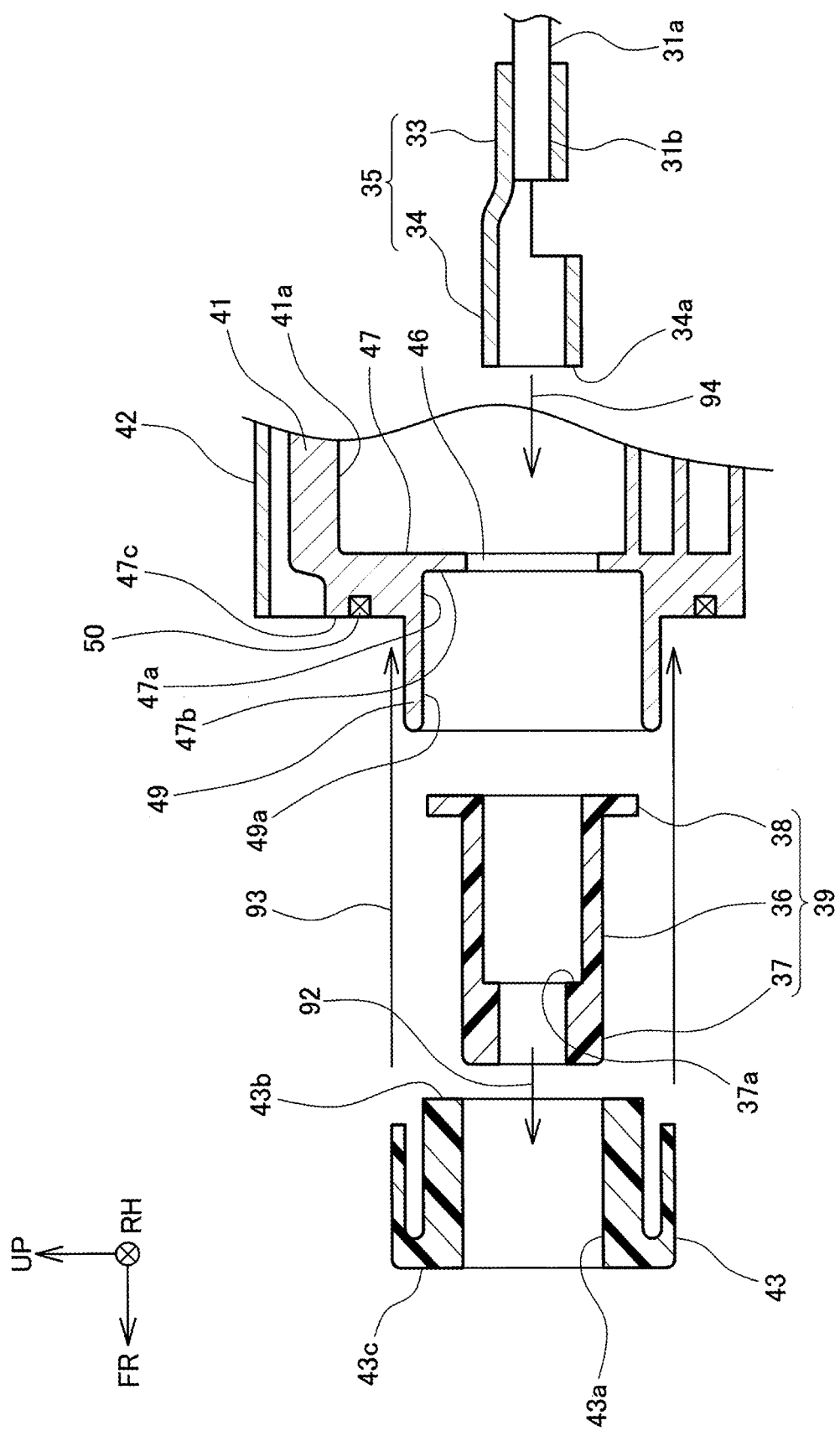
FIG. 7 is an exploded cross-sectional view showing the part C shown in FIG. 6 in detail.

As shown in FIGS. 3, 4, and 6, the casing body 41 is an open box-type member with an inner space 41a housing one ends of the first high-voltage cables 30. On the vehicle front side of a bottom plate 47 of the casing body 41, there is an annular protruding portion 49 protruding from the bottom plate 47 toward the vehicle front side. An inner side 49a of the protruding portion 49 is connected to a recess 47a provided in the center of the bottom plate 47 on the vehicle front side. The recess 47a has a hole 46 in the center. The insulating bushing 43 is a rounded corner, square-shaped insulating member placed over the protruding portion 49 from the vehicle front side. The insulating bushing 43 protrudes from the bottom plate 47 of the casing body 41 toward the front side of the vehicle and fits into the inner surface of the connector receptacle 21 in the high-voltage control unit 20. As shown in FIGS. 4, 6, and 7, the insulating bushing 43 has two through holes 43a extending along the front-and-rear direction, and the insulating tubes 39 are fitted into the through holes 43a. The insulating tube 39 will be described in detail below with reference to FIGS. 5 to 7.

An O-ring 50 is attached to a front surface 47c of the bottom plate 47 of the casing body 41 to seal between the insulating bushing 43 and the unit casing 25 of the high-voltage control unit 20 when the insulating bushing 43 is fitted into the inner surface of the connector receptacle 21.

In a lower part of the casing body 41, there is a groove 51 extending vertically and connecting a lower end of the casing body 41 and the inner space 41a. The groove 51 houses the first high-voltage cable 30. The groove 51 also has a horizontal groove 52 therein, and a projection 32a on an outer surface of the first high-voltage cable 30 fits into the horizontal groove 52, thereby defining a position of the first high-voltage cable 30 with respect to the casing body 41.

As shown in FIG. 5, the first high-voltage cable 30 is composed of an inner conductor 31, and an insulating coating 32 covering the outside of the conductor 31. The insulating coating 32 of the first high-voltage cable 30 is removed from a tip portion 31a housed in the inner space 41a of the casing body 41. In the inner space 41a of the casing body 41, the tip portion 31a is bent toward the vehicle front side, and its tip 31b has the connector-side mating terminal 35 attached thereto.

The connector-side mating terminal 35 has a crimp portion 33 that is crimped onto the tip 31b of the conductor 31 of the first high-voltage cable 30 and fixed to the conductor 31, and a mating portion 34 that is circular and protrudes from the crimp portion 33 toward the vehicle front side. A tip portion of an equipment-side mating terminal 22 attached to the connector receptacle 21 of the high-voltage control unit 20 shown in FIG. 3 fits into and mates with the mating portion 34. Here, the equipment-side mating terminal 22 is connected to the high-voltage equipment (not shown) in the high-voltage control unit 20.

The insulating tube 39 includes a body portion 36, a flange 38 formed on the rear side of the body portion 36, and a tip portion 37 formed on the front side of the body portion 36. The inner diameter of the body portion 36 and the outer diameter of the mating portion 34 of the connector-side mating terminal 35 are the same, and the outer circumference of the mating portion 34 fits into the body portion 36. The inner diameter of the tip portion 37 and the inner diameter of the mating portion 34 are almost the same, and an axial end surface 34a of the mating portion 34 comes into contact with an inner end surface 37a.

As shown by an arrow 92 in FIG. 7, each of the insulating tubes 39 is inserted into a corresponding one of the two through holes 43a in the insulating bushing 43 from the rear side. The insulating bushing 43, to which the insulating tubes 39 are inserted, is placed over the protruding portion 49 of the casing body 41 from the vehicle front side as shown by an arrow 93 in FIG. 7 and thus attached to the casing body 41. As a result, the flange 38 of the insulating tube 39 is sandwiched between a rear end surface 43b of the insulating bushing 43 and a front surface 47b of the recess 47a of the bottom plate 47, and its position in the front-and-rear direction is fixed. As shown in FIG. 6, the insulating tubes 39 are thus fixed to the casing body 41 such that the tip portions 37 protrude beyond a front end surface 43c of the insulating bushing 43.

When the mating portions 34 of the connector-side mating terminals 35 are inserted, from the rear side, into the inner surfaces of the body portions 36 of the insulating tubes 39 fixed to the casing body 41, as shown by an arrow 91 in FIG. 5 and an arrow 94 in FIG. 7, the axial end surfaces 34a of the mating portions 34 come into contact with the inner end surfaces 37a of the tip portions 37, and thus, positions of the connector-side mating terminals 35 with respect to the insulating tubes 39 are defined. As a result, as shown in FIG. 6, the insulating tubes 39 are disposed between the outer circumferences of the connector-side mating terminals 35 and the insulating bushing 43 fixed to the casing body 41, and the tip portions 37 of the insulating tubes 39 protrude beyond the front end surface 43c of the insulating bushing 43.

Returning to FIG. 3, the casing lid 42 is a member that covers an open area on the vehicle rear side of the casing body 41 and the groove 51. An insulating plate 45 is attached on the casing body 41 side of the casing lid 42. When the casing lid 42 is assembled to the rear side of the casing body 41, the insulating plate 45 supports the tip portion 31a of the conductor 31 of the first high-voltage cable 30 from behind.

For each first high-voltage cable 30 having the connector-side mating terminal 35 on its tip 31b, the axial end surface 34a of the mating portion 34 of the connector-side mating terminal 35 comes in contact with the inner end surface 37a of the tip portion 37 of the insulating tube 39 fixed to the casing body 41. The rear side of the tip portion 31a of the conductor 31 comes into contact with the insulating plate 45 of the casing lid 42 assembled to the casing body 41, and it is thus fixed with respect to the casing body 41 in the vehicle front-and-rear direction.

Under the casing body 41 and the casing lid 42, a cable cover 48 is attached to allow the first high-voltage cables 30 to extend downward.

The first connector 40 is configured as described above, and therefore, by advancing the casing 44 toward the high-voltage control unit 20, it is possible to insert the insulating bushing 43 into the connector receptacle 21 of the high-voltage control unit 20 to thereby connect the two connector-side mating terminals 35 fixed inside the first connector 40 and the two equipment-side mating terminals 22 fixed in the high-voltage control unit 20. By retracting the casing 44 from the high-voltage control unit 20, it is also possible to pull out the insulating bushing 43 of the first connector 40 from the connector receptacle 21 and disconnect the two connector-side mating terminals 35 and the two equipment-side mating terminals 22, thereby shutting off the high-voltage circuit. The high-voltage control unit 20 and the first connector 40 are housed in the front compartment 14, which is partitioned from the passenger compartment 11 by the dash panel 13, and therefore, propagation of electromagnetic waves from the high-voltage cable connection structure 100 into the passenger compartment 11 can be reduced.

It is thus no longer necessary to dispose the service plug near the passenger compartment 11 as in the conventional techniques described in JP 2017-052302 A, and electromagnetic waves propagating into the passenger compartment can be reduced with a simple configuration that does not require installation of parts to reduce propagation of electromagnetic waves into the passenger compartment.

In addition, for the first connector 40, the tip portions 37 of the insulating tubes 39, which are disposed between the outer circumferences of the connector-side mating terminals 35 and the insulating bushing 43 fixed to the casing body 41, are disposed so as to cover the axial end surfaces 34a of the mating portions 34 of the connector-side mating terminals 35 and protrude forward beyond the front end surface 43c of the insulating bushing 43. This makes it possible to prevent workers from contacting the connector-side mating terminals 35 during maintenance. This can enhance the safety of maintenance work.

Next, a variant of the bolt 54 that secures a bracket 53 of the first connector 40 to the unit casing 25 of the high-voltage control unit 20 of the high-voltage cable connection structure 100 will be described with reference to FIG. 8.

As shown in FIG. 1, the first connector 40 is secured to the unit casing 25 of the high-voltage control unit 20 by means of the bolt 54 with the insulating bushing 43 inserted into the connector receptacle 21 of the high-voltage control unit 20 and the connector-side mating terminals 35 connected to the equipment-side mating terminals 22.

Figure 8:
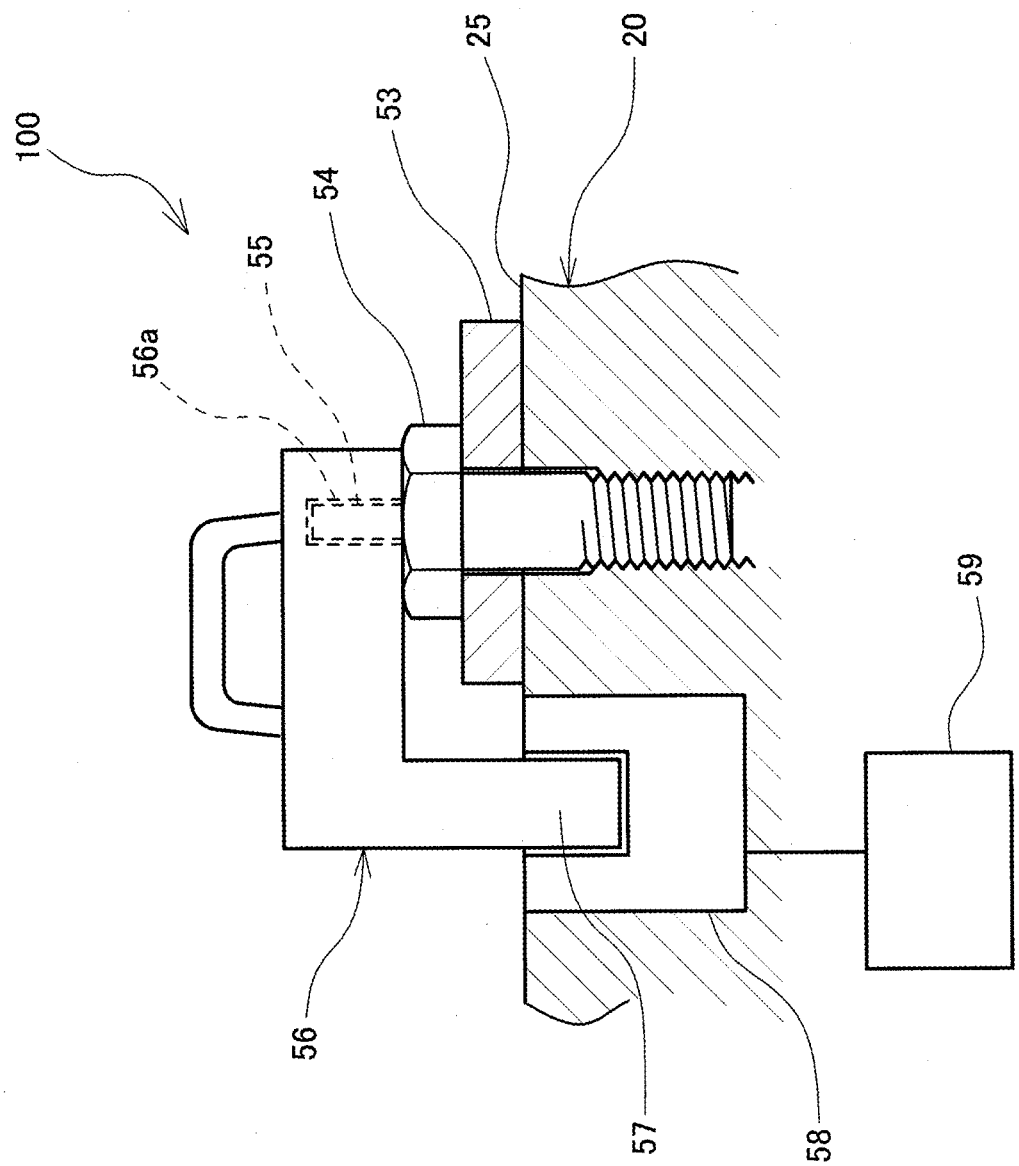
FIG. 8 is a view showing a variation of the high-voltage cable connection structure according to the embodiment, illustrating a cross-sectional view of a bolt connecting the first connector to the high-voltage control unit and an interlock plug.

As shown in FIG. 8, a protrusion 55 is provided on the top of the bolt 54. A key portion 56a of an interlock plug 56 fits with the protrusion 55. Thus, the bolt 54 is configured in such a way that it cannot be removed without pulling out the interlock plug 56. The high-voltage control unit 20 is equipped with an interlock device 59 and an interlock plug receptacle 58 in which a tip 57 of the interlock plug 56 is inserted.

The interlock plug receptacle 58 outputs an interlock signal to the interlock device 59 when the interlock plug 56 is pulled out. When the interlock device 59 receives the interlock signal as an input, it outputs a signal to shut off system main relays (not shown) that are provided between the positive and negative terminals of the high voltage battery 15 and the first high voltage cable 30.

Since the bolt 54 is configured as described above, it can only be accessed after the interlock plug 56 is removed for maintenance and the interlock device 59 shuts off the system main relays. This can enhance the safety of maintenance work.

A high-voltage cable connection structure 200 according to another embodiment will be described with reference to FIG. 9. The portions that are identical to those of the high-voltage cable connection structure 100 described above with reference to FIGS. 1 and 8 are assigned the same reference signs, and their descriptions will be omitted.

Figure 9:
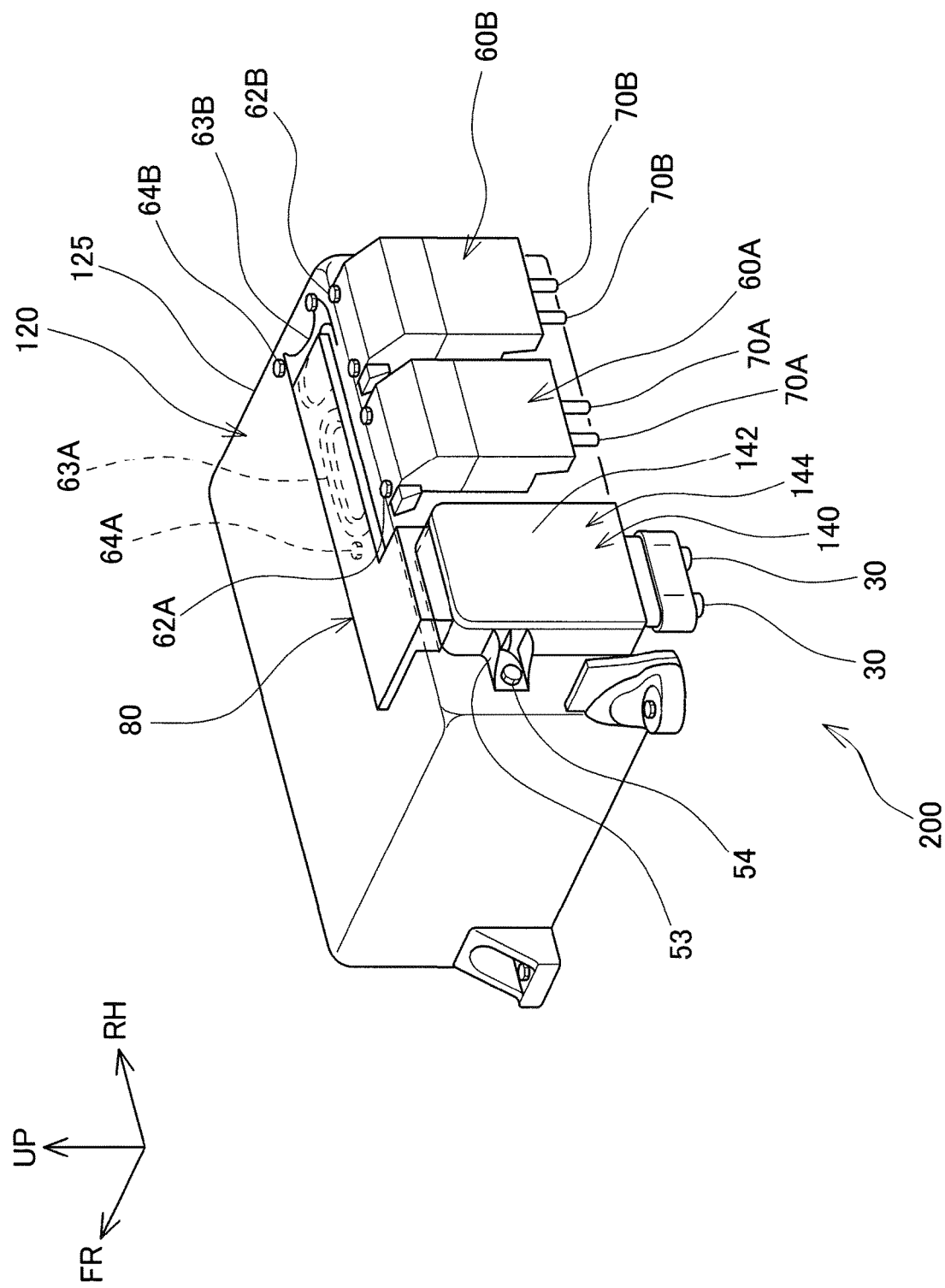
FIG. 9 is a perspective view showing the high-voltage control unit, the first connector, and second connectors connected by a high-voltage cable connection structure according to another embodiment.

As shown in FIG. 9, the high-voltage cable connection structure 200 according to the other embodiment is composed of a first connector 140 and the connector receptacle 21 in a high-voltage control unit 120. The connector receptacle 21 has the same structure as that of the high-voltage cable connection structure 100 described above with reference to FIGS. 1 to 8.

As shown in FIG. 9, the high-voltage control unit 120 is composed of a generally rectangular parallelepiped unit casing 125 and high-voltage equipment contained therein, and the first connector 140 and two second connectors 60A and 60B are secured to the vehicle rear side surface of the high-voltage control unit 120 with bolts 54, 62A, and 62B, respectively.

The second connector 60A is connected to two second high-voltage cables 70A connecting the high-voltage control unit 120 and a high-voltage device (not shown). The second connector 60A is inserted into the connector receptacle (not shown) of the high-voltage control unit 120, thereby connecting the high-voltage device and the high-voltage equipment contained in the high-voltage control unit 120. The second connector 60B has the same structure as the second connector 60A and is connected to two second high-voltage cables 70B to connect another high-voltage device and the high-voltage equipment contained in the high-voltage control unit 120.

The second connectors 60A and 60B are bolted connectors, and their internal terminal boards (not shown) are fastened to a terminal block (not shown) provided inside the high-voltage control unit 120 with fastening bolts (not shown). Here, the terminal boards, the terminal block, and the fastening bolts are live parts that are conductive parts intended to be energized during normal use. The top surface of the high-voltage control unit 120 has holes (not shown) for access to the fastening bolts. These holes are blocked by service covers 63A and 63B that are secured to the unit casing 125 with fastening bolts 64A and 64B which are fastening members.

The high voltage control unit 120 and the high-voltage devices may be any device that controls high voltage. To give an example, the high voltage control unit 120 may be an electricity supply unit (ESU) that distributes and supplies high voltage power from the high voltage battery 15 to the two high voltage devices. The high voltage device may be a PCU that controls drive power to the motor.

As shown in FIG. 9, the first connector 140 has an arm 80 on the top surface of a casing lid 142 constituting a casing 144. Other than this, the structure of the first connector 140 is identical to that of the first connector 40 described above with reference to FIGS. 1 to 8.

As shown in FIG. 9, the arm 80 extends along the top surface of the unit casing 125 of the high-voltage control unit 120 so as to cover the top of the fastening bolts 64A and 64B that secure the service covers 63A and 63B to the unit casing 125. It is thus impossible to access the fastening bolts 64A and 64B and remove the service covers 63A and 63B during maintenance without removing the bolts 54 and pulling the first connector 140 out of the high-voltage control unit 120. Thus, the fastening bolts that fasten the live parts of the second connectors 60A and 60B cannot be removed until after the first connector 140 is removed from the high-voltage control unit 120 and the high-voltage circuit is shut off. This can enhance the safety of maintenance work.

Like the high-voltage cable connection structure 100, the high-voltage cable connection structure 200 makes it possible to shut off the high-voltage circuit by pulling out the first connector 140.

The high-voltage cable connection structure 200 also makes it possible to reduce propagation of electromagnetic waves from the high-voltage cable connection structure 200 into the passenger compartment 11, because the high-voltage control unit 120 and the first connector 140 are housed in the front compartment 14. It is thus no longer necessary to dispose the service plug near the passenger compartment 11 as in the conventional techniques described in JP 2017-052302 A, and electromagnetic waves propagating into the passenger compartment can be reduced with a simple configuration that does not require installation of parts to reduce propagation of electromagnetic waves into the passenger compartment.

Although, in the above description, the high-voltage control units 20 and 120 and the first connectors 40 and 140 constituting the high-voltage cable connection structures 100 and 200 are disposed in the front compartment 14 of the vehicle 10, this is not limiting, and they may be located in other places so long as they are outside the passenger compartment 11. For example, they may be disposed in a rear compartment of the vehicle (not shown). Even in this case, it is still possible to reduce propagation of electromagnetic waves from the high-voltage cable connection structures 100 and 200 into the passenger compartment 11.

Although, in the above description, the first connector 40 is connected to the two first high-voltage cables 30, each connected to a corresponding one of the positive and negative terminals of the high-voltage battery 15, this is not limiting, and it may be connected to three or more first high-voltage cables 30. In that case, the equipment-side mating terminals 22 fixed in the high-voltage control unit 20 may also be three or more. Similarly, three or more multiple second high-voltage cables 70A and 70B may be connected to the second connectors 60A and 60B.

In addition, although, in the above description, the service covers 63A and 63B are secured to the unit casing 125 with the fastening bolts 64A and 64B, this is not limiting, and they may be secured to the unit casing 125 by setting embedded bolts in the unit casing 125 and screwing nuts into them. In this case, the nuts constitute the fastening members.

The invention claimed is:

1. A high-voltage cable connection structure, comprising:
    a first connector to which a plurality of first high-voltage cables is connected, each of the plurality of first high-voltage cables being connected to a corresponding one of a plurality of terminals of a high-voltage battery; and
    a connector receptacle provided in a high-voltage control unit disposed outside a vehicle passenger compartment, wherein
    inserting the first connector into and pulling out the first connector from the connector receptacle allows connection and disconnection between the plurality of first high-voltage cables and the high-voltage control unit,
    a bolt that secures the first connector to the high-voltage control unit with the first connector inserted in the connector receptacle;
    an interlock device that is provided in the high-voltage control unit and outputs a signal that shuts off system main relays arranged between the plurality of terminals of the high-voltage battery and the plurality of first high-voltage cables;
    an interlock plug receptacle provided in the high-voltage control unit and connected to the interlock device; and
    an interlock plug to be inserted into the interlock plug receptacle, wherein the interlock plug is engaged with the bolt when it is inserted into the interlock plug receptacle.

2. The high-voltage cable connection structure according to claim 1, wherein
    the first connector comprises a casing in which a plurality of connector-side mating terminals, each of the plurality of connector-side mating terminals connected to one end of a corresponding one of the plurality of first high-voltage cables, and the ends of the plurality of first high-voltage cables are fixed inside,
    the connector receptacle comprises a plurality of equipment-side mating terminals connected to the high-voltage control unit,
    each of the plurality of connector-side mating terminals is mated with a corresponding one of the plurality of equipment-side mating terminals, and
    advancing and retracting the casing of the first connector with respect to the high-voltage control unit allows the plurality of connector-side mating terminals to mate with the plurality of equipment-side mating terminals and the plurality of connector-side mating terminals to be removed from the plurality of equipment-side mating terminals.

3. The high-voltage cable connection structure according to claim 2, wherein
    the first connector comprises insulating tubes disposed between outer circumferences of the plurality of connector-side mating terminals and the casing, and
    tip portions of the insulating tubes protrude beyond an end surface of the casing.

4. The high-voltage cable connection structure according to claim 1, wherein
    a second connector to which a plurality of second high-voltage cables is connected is connected to the high-voltage control unit, the second high-voltage cable connecting between the high-voltage control unit and a high-voltage device disposed outside the high-voltage control unit,
    the high-voltage control unit comprises
        a unit casing, and
        service covers, and
    the first connector has an arm that extends over a fastening member securing the service covers to the unit casing so as to cover the fastening member to prevent access to the fastening member.

5. The high-voltage cable connection structure according to claim 2, wherein
    a second connector to which a plurality of second high-voltage cables is connected is connected to the high-voltage control unit, the second high-voltage cable connecting between the high-voltage control unit and a high-voltage device disposed outside the high-voltage control unit,
    the high-voltage control unit comprises
        a unit casing, and
        service covers, and
    the first connector has an arm that extends over a fastening member securing the service covers to the unit casing so as to cover the fastening member to prevent access to the fastening member.

6. The high-voltage cable connection structure according to claim 3, wherein
    a second connector to which a plurality of second high-voltage cables is connected is connected to the high-voltage control unit, the second high-voltage cable connecting between the high-voltage control unit and a high-voltage device disposed outside the high-voltage control unit,
    the high-voltage control unit comprises
        a unit casing, and
        service covers, and
    the first connector has an arm that extends over a fastening member securing the service covers to the unit casing so as to cover the fastening member to prevent access to the fastening member.

* * * * *